(12) United States Patent
Zhu

(10) Patent No.: US 12,217,919 B2
(45) Date of Patent: Feb. 4, 2025

(54) ELECTRICAL NETWORK HAVING FAULT PROTECTION CONTROL

(71) Applicant: Siemens Aktiengesellschaft, Munich (DE)

(72) Inventor: Yi Zhu, Kuemmersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 359 days.

(21) Appl. No.: 17/599,076

(22) PCT Filed: Sep. 13, 2019

(86) PCT No.: PCT/EP2019/074545
§ 371 (c)(1),
(2) Date: Sep. 28, 2021

(87) PCT Pub. No.: WO2020/200496
PCT Pub. Date: Oct. 8, 2020

(65) Prior Publication Data
US 2022/0200275 A1    Jun. 23, 2022

(30) Foreign Application Priority Data

Mar. 29, 2019 (WO) ................ PCT/CN2019/080553
Mar. 29, 2019 (WO) ................ PCT/CN2019/080554
Mar. 29, 2019 (WO) ................ PCT/CN2019/080558

(51) Int. Cl.
*H01H 33/59*     (2006.01)
*H01H 9/54*      (2006.01)
(Continued)

(52) U.S. Cl.
CPC .......... *H01H 33/596* (2013.01); *H01H 9/542* (2013.01); *H02H 1/0007* (2013.01);
(Continued)

(58) Field of Classification Search
CPC .......... H01H 2009/544; H01H 33/596; H01H 9/542; H02H 1/0007; H02H 3/087;
(Continued)

(56) References Cited

U.S. PATENT DOCUMENTS 5,654,859 A    8/1997  Shi
8,803,358 B2   8/2014  Hafner et al.
(Continued)

FOREIGN PATENT DOCUMENTS

CA    2910979 A1    1/2015
CN    101741057 A   6/2010
(Continued)

OTHER PUBLICATIONS

PCT International Search Report and Written Opinion of International Searching Authority mailed Dec. 10, 2019 in PCT International Application No. PCT/EP2019/074539 filed Sep. 13, 2019.
(Continued)

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

An electrical network includes feed-in devices, loads, and a distribution grid, which is arranged therebetween and comprises at least one busbar and at least one device for opening or closing a DC circuit. The at least one device includes: an electric switch for opening or closing the DC circuit; a fault current detection device; a trigger unit; a precharging device; and a control unit for automatically closing the electric switch after the precharging process. The electric switch opens the DC circuit via the trigger unit if a fault current is detected by the fault current detector, and the precharging device restores the voltage on the busbar prior to closing the electric switch. Multiple loads can be indi-
(Continued)

vidually electrically separated via a respective electromechanical switch, and multiple loads can be electrically separated as a group via the at least one device.

21 Claims, 3 Drawing Sheets

(51) Int. Cl.

| | | |
|---|---|---|
| H02H 1/00 | (2006.01) | |
| H02H 3/087 | (2006.01) | |
| H02H 7/125 | (2006.01) | |
| H02H 7/22 | (2006.01) | |
| H02H 7/26 | (2006.01) | |
| H02H 9/00 | (2006.01) | |
| H02J 1/10 | (2006.01) | |
| H02J 1/12 | (2006.01) | |

(52) U.S. Cl.
CPC .......... *H02H 3/087* (2013.01); *H02H 7/1252* (2013.01); *H02H 7/1257* (2013.01); *H02H 7/222* (2013.01); *H02H 7/268* (2013.01); *H02H 9/001* (2013.01); *H02J 1/10* (2013.01); *H02J 1/12* (2013.01); *H01H 2009/544* (2013.01)

(58) Field of Classification Search
CPC .... H02H 7/1252; H02H 7/1257; H02H 7/268; H02H 9/001; H02J 1/10; H02J 1/12
See application file for complete search history.

(56) References Cited

U.S. PATENT DOCUMENTS

| | | | | |
|---|---|---|---|---|
| 9,042,146 | B2* | 5/2015 | Weiss | H02M 7/537 |
| | | | | 363/131 |
| 9,184,003 | B2* | 11/2015 | Crane | H01H 33/596 |
| 9,525,284 | B2 | 12/2016 | Kim et al. | |
| 9,698,589 | B1 | 7/2017 | Leyh | |
| 9,755,433 | B2* | 9/2017 | Xu | H02J 9/06 |
| 9,853,536 | B2 | 12/2017 | Xu et al. | |
| 10,693,293 | B2 | 6/2020 | Qi et al. | |
| 10,862,300 | B2* | 12/2020 | Haugan | H02J 7/34 |
| 10,944,254 | B2 | 3/2021 | Shi et al. | |
| 2004/0027734 | A1 | 2/2004 | Fairfax et al. | |
| 2005/0052798 | A1 | 3/2005 | Grisoni | |
| 2007/0014062 | A1 | 1/2007 | Fischer | |
| 2007/0077830 | A1 | 4/2007 | Rzadki et al. | |
| 2010/0118450 | A1 | 5/2010 | Ritzinger et al. | |
| 2010/0231042 | A1 | 9/2010 | Weale | |
| 2010/0292853 | A1 | 11/2010 | McDonnell | |
| 2011/0127853 | A1 | 6/2011 | Fujita et al. | |
| 2011/0298283 | A1 | 12/2011 | Sannino et al. | |
| 2012/0218676 | A1 | 8/2012 | Demetriades et al. | |
| 2013/0021708 | A1 | 1/2013 | Demetriades et al. | |
| 2013/0106184 | A1 | 5/2013 | Hafner et al. | |
| 2013/0121051 | A1 | 5/2013 | Weiss et al. | |
| 2013/0270902 | A1 | 10/2013 | Andersen et al. | |
| 2013/0307444 | A1 | 11/2013 | Settemsdal | |
| 2013/0314828 | A1 | 11/2013 | Chen et al. | |
| 2014/0063669 | A1 | 3/2014 | Lundqvist | |
| 2014/0078622 | A1* | 3/2014 | Crane | H01H 33/596 |
| | | | | 361/8 |
| 2014/0254050 | A1 | 9/2014 | Haines et al. | |
| 2014/0361621 | A1 | 12/2014 | Lindtjorn | |
| 2015/0014277 | A1 | 1/2015 | Theisen et al. | |
| 2015/0137595 | A1 | 5/2015 | Xu et al. | |
| 2016/0152151 | A1 | 6/2016 | Yang et al. | |
| 2016/0172838 | A1 | 6/2016 | Luebke et al. | |
| 2016/0190791 | A1 | 6/2016 | Sim | |
| 2016/0336734 | A1* | 11/2016 | Lee | H01H 9/54 |
| 2017/0054291 | A1 | 2/2017 | Qi et al. | |
| 2017/0098931 | A1 | 4/2017 | Gerdinand et al. | |
| 2017/0170663 | A1 | 6/2017 | Christ et al. | |
| 2017/0373498 | A1 | 12/2017 | Haugan et al. | |
| 2018/0034258 | A1 | 2/2018 | Schweitzer, III et al. | |
| 2018/0159315 | A1 | 6/2018 | Aagesen et al. | |
| 2018/0240627 | A1 | 8/2018 | Matsuo et al. | |
| 2018/0241200 | A1 | 8/2018 | Hu et al. | |
| 2019/0020193 | A1 | 1/2019 | Cao et al. | |
| 2019/0190258 | A1 | 6/2019 | Shi et al. | |
| 2019/0267842 | A1 | 8/2019 | Richter | |
| 2019/0334340 | A1 | 10/2019 | Niehoff | |
| 2019/0353689 | A1 | 11/2019 | Hauer | |
| 2020/0119548 | A1 | 4/2020 | Haugan | |
| 2021/0339692 | A1 | 11/2021 | Miro Bargallo et al. | |
| 2021/0359632 | A1 | 11/2021 | Valasek et al. | |
| 2022/0020544 | A1* | 1/2022 | Zhu | H02H 9/001 |
| 2022/0166214 | A1* | 5/2022 | Batra | H02H 3/087 |
| 2022/0172914 | A1* | 6/2022 | Batra | H01H 33/596 |

FOREIGN PATENT DOCUMENTS

| | | |
|---|---|---|
| CN | 202305715 U | 7/2012 |
| CN | 102696087 A | 9/2012 |
| CN | 102959818 A | 3/2013 |
| CN | 103457246 A | 12/2013 |
| CN | 203352192 U | 12/2013 |
| CN | 103762546 A | 4/2014 |
| CN | 104242229 A | 12/2014 |
| CN | 104518564 A | 4/2015 |
| CN | 104617573 A | 5/2015 |
| CN | 104638618 A | 5/2015 |
| CN | 105162093 A | 12/2015 |
| CN | 105207178 A | 12/2015 |
| CN | 105305372 A | 2/2016 |
| CN | 105322514 A | 2/2016 |
| CN | 105529677 A | 4/2016 |
| CN | 105743058 A | 7/2016 |
| CN | 105762775 A | 7/2016 |
| CN | 106099878 A | 11/2016 |
| CN | 106253243 A | 12/2016 |
| CN | 106486965 A | 3/2017 |
| CN | 106663557 A | 5/2017 |
| CN | 106786403 A | 5/2017 |
| CN | 206442309 U | 8/2017 |
| CN | 107210603 A | 9/2017 |
| CN | 107276045 A | 10/2017 |
| CN | 107565524 A | 1/2018 |
| CN | 107768195 A | 3/2018 |
| CN | 107810583 A | 3/2018 |
| CN | 108092253 A | 5/2018 |
| CN | 108152633 A | 6/2018 |
| CN | 108448548 A | 8/2018 |
| CN | 109193661 A | 1/2019 |
| CN | 109494693 A | 3/2019 |
| CN | 109494695 A | 3/2019 |
| EP | 2523331 A1 | 11/2012 |
| EP | 2634885 A1 | 9/2013 |
| EP | 3109964 A1 | 12/2016 |
| EP | 3379674 A1 | 9/2018 |
| EP | 3477809 A1 | 5/2019 |
| KR | 20160035845 A | 4/2016 |
| WO | WO-2005049418 A2 | 6/2005 |
| WO | WO-2012/123015 A1 | 9/2012 |
| WO | WO 2013131782 A1 | 9/2013 |
| WO | WO 2018028247 A1 | 2/2018 |
| WO | WO-2018/109161 A1 | 6/2018 |

OTHER PUBLICATIONS

ABB Substation Automation Products and Systems, "REF 541, 543, 545 Protection, Monitoring and Control Technical Reference Manual Part 1, General," 1 MRS750527-MUM, Sep. 29, 1997.

PCT International Search Report and Written Opinion of International Searching Authority mailed Dec. 10, 2019 in PCT International Application No. PCT/EP2019/074541 filed Sep. 13, 2019.

PCT International Search Report and Written Opinion of International Searching Authority mailed Dec. 6, 2019 in PCT International Application No. PCT/EP2019/074542 filed Sep. 13, 2019.

(56) References Cited

OTHER PUBLICATIONS

PCT International Search Report and Written Opinion of International Searching Authority mailed Dec. 9, 2019 in PCT International Application No. PCT/EP2019/074544 filed Sep. 13, 2019.
PCT International Search Report and Written Opinion of International Searching Authority mailed Dec. 10, 2019 in PCT International Application No. PCT/EP2019/074545 filed Sep. 13, 2019.
U.S. Appl. No. 17/599,055, filed Sep. 28, 2021.
U.S. Appl. No. 17/599,067, filed Sep. 28, 2021.
U.S. Appl. No. 17/599,103, filed Sep. 28, 2021.
U.S. Appl. No. 17/599,119, filed Sep. 28, 2021.
Lin Wenfu:; "Electrical Operation of Power Units"; pp. 356-358; China Water & Power Press, Mar. 2007 (and English translation thereof).

* cited by examiner

ELECTRICAL NETWORK HAVING FAULT PROTECTION CONTROL

CROSS-REFERENCE TO RELATED APPLICATIONS

This application is the National Phase under 35 U.S.C. § 371 of PCT International Application No. PCT/EP2019/074545, which has an international filing date of Sep. 13, 2019, and which claims priority to PCT International Application No. PCT/CN2019/080553 filed Mar. 29, 2019, PCT International Application No. PCT/CN2019/080554 filed Mar. 29, 2019, and PCT International Application No. PCT/CN2019/080558 filed Mar. 29, 2019, the entire contents of each of which are incorporated herein by reference.

FIELD

Example embodiments of the present application relate to an electrical network.

BACKGROUND

DC distribution networks offer advantages over AC distribution networks, especially if renewable energy sources are present in parallel with other feed-in devices. Firstly, DC distribution networks can be constructed more cost-effectively and have higher energy efficiency. In the case of renewable energy generation, for example via photovoltaics, DC-to-AC and AC-to-DC converters can be replaced with simple DC-to-DC converters. In the case of feed-in devices or systems including batteries or capacitor banks as energy buffers, these can be coupled directly to the system without any additional converters.

If active front end (AFE) converters are used, energy can be transmitted back into the power grid, for example in the case of renewable energy sources or in the case of the braking energy from motors. Active front end (AFE) converters can thus stabilize the grid and also increase the quality of AC networks via reactive power compensation.

However, DC distribution networks also entail problems with respect to electrical protection. In the event of a fault, charging operations for capacitor banks or DC link capacitors can produce extremely high current spikes within a very short time, ranging from a few hundred μs (microseconds) to a few ms (milliseconds).

FIG. 1 illustrates a typical DC distribution network 100, which has feed-in devices 1010; 1011; 1012; 1013; 1014; 1015 and loads 1050; 1051; 1051; 1053. A distribution network 2000 is arranged between the feed-in devices 1010; 1011; 1012; 1013; 1014; 1015 and the loads 1050; 1051; 1051; 1053. Said distribution network comprises a busbar 200, to which the feed-in devices 1010; 1011; 1012; 1013; 1014; 1015 and the loads 1050; 1051; 1051; 1053 are electrically connected. For example, the feed-in devices 1010; 1011 may be AC sources, which are connected to the distribution network 2000 via active front end (AFE) converters 1020; 1021. The DC distribution network 100 may, for example, comprise further feed-in devices, such as feed-in device 1012 including a photovoltaics module, feed-in device 1013 in the form of a battery, feed-in device 1014 in the form of a capacitor bank for storing energy, or feed-in device 1015 in the form of a further type of feed-in device with power converters.

Protection devices 2050; 2051; 2052; 2053; 2054; 2055; 2056; 2057; 2058; 2059; 2060; 2061, which, in the event of a fault, can electrically disconnect feed-in devices 1010; 1011; 1012; 1013; 1014; 1015 or loads 1050; 1051; 1051; 1053 from the busbar 200, are arranged in the distribution network 2000.

In a system of this kind with a plurality of feed-in devices 1010; 1011; 1012; 1013; 1014; 1015, the branch with the smallest load is problematic. It is very challenging to design the DC network so as to achieve selectivity of the various protection devices and of the fast self-protection functions of the power electronics in the converters.

A conventional mechanical electrical switch (molded case circuit breaker, MCCB) is not fast enough to interrupt the discharging of the capacitors in the event of a fault; instead, these only become active after the discharge maximum. There is a risk, as a result, of cables being destroyed, of the IGBTs in the active front ends (AFEs) being switched off by the self-protection functions, and of the active front ends (AFEs) acting as uncontrolled rectifiers. Freewheeling diodes may burn out if the fuses on the AC side are not fast enough. A further problem is that the voltage dips at the busbar 200 and all the capacitors are discharged. A long recharging time delays the restarting of the entire system after a fault has been eliminated.

A problem with the use of solid-state switches (solid-state circuit breakers, SSCBs) as protection devices is that they exhibit high power losses, and the high costs associated therewith discourage the exclusive use of these protection devices.

SUMMARY

Example embodiments of the present application provide an alternative electrical network which mitigates or even overcomes one or more of the described disadvantages.

At least one example embodiment, according to the invention, is directed to an electrical network. Advantageous configurations of the electrical network are specified in the claims.

An electrical network, according to at least one example embodiment of the invention, has feed-in devices, loads and a distribution network, which is arranged therebetween and has at least one busbar and at least one apparatus for opening or closing a DC circuit. The apparatus comprises:
an electrical switch for opening or closing the DC circuit,
a fault current detection device,
a tripping unit,
a pre-charging apparatus, and
a control unit for automatically closing the electrical switch after pre-charging,
wherein, if a fault current is detected by the fault current detection device, the electrical switch opens the DC circuit by the tripping unit, and the pre-charging apparatus restores the voltage on the busbar before the electrical switch is closed, wherein a plurality of loads can each individually be electrically disconnected by an electromechanical switch, and a plurality of loads can be electrically disconnected as a group by the at least one apparatus.

An electrical network, according to at least one example embodiment of the invention, has an advantage that the number of electrical switches, for example of solid-state switches, can be reduced, and both costs and power losses can thus be reduced. The fault current can be interrupted quickly, within 10 μs (microseconds), wherein the fault itself can be isolated more slowly using conventional electromechanical switches. After the loads are very quickly disconnected from the feed-in devices in the event of a fault, the actual isolation of the fault takes place via the electromechanical switches at a reduced fault current, or even at zero current in certain applications. As a result, the proposed electromechanical switches can have much smaller dimensions in comparison with switches in conventional networks. A further advantage is that the voltage on the busbar 200 is maintained and the rest of the system which is unaffected by the fault remains operable. Recharging the group is a much faster process than recharging the entire system.

In one configuration, the electrical switch of the at least one apparatus is a semiconductor switch.

In a further configuration, the at least one apparatus further comprises a communication unit.

The at least one apparatus may further comprise a control unit for a switch-on transient. This unit can suppress the switch-on transient.

In a further configuration, the pre-charging apparatus restores the voltage on the busbar after a first waiting time. Alternatively, the pre-charging apparatus can restore the voltage on the busbar after receiving a command. The pre-charging apparatus can receive this command via the communication unit.

In one configuration, the pre-charging apparatus interrupts the pre-charging operation if the voltage on the busbar does not rise, which indicates a fault that still exists.

In a further configuration, the control unit for automatically closing the electrical switch automatically closes said switch after a second waiting time. Alternatively, the control unit for automatically closing the electrical switch closes said switch after a voltage on the busbar above a threshold value has been restored.

In a further configuration, the electrical network is a DC circuit.

BRIEF DESCRIPTION OF THE DRAWINGS

The above-described properties, features and advantages of this invention and the manner in which they are achieved will become clearer and more distinctly comprehensible in connection with the following description of the embodiments which are explained in more detail in connection with the figures, in which.

DETAILED DESCRIPTION

Figure 1:
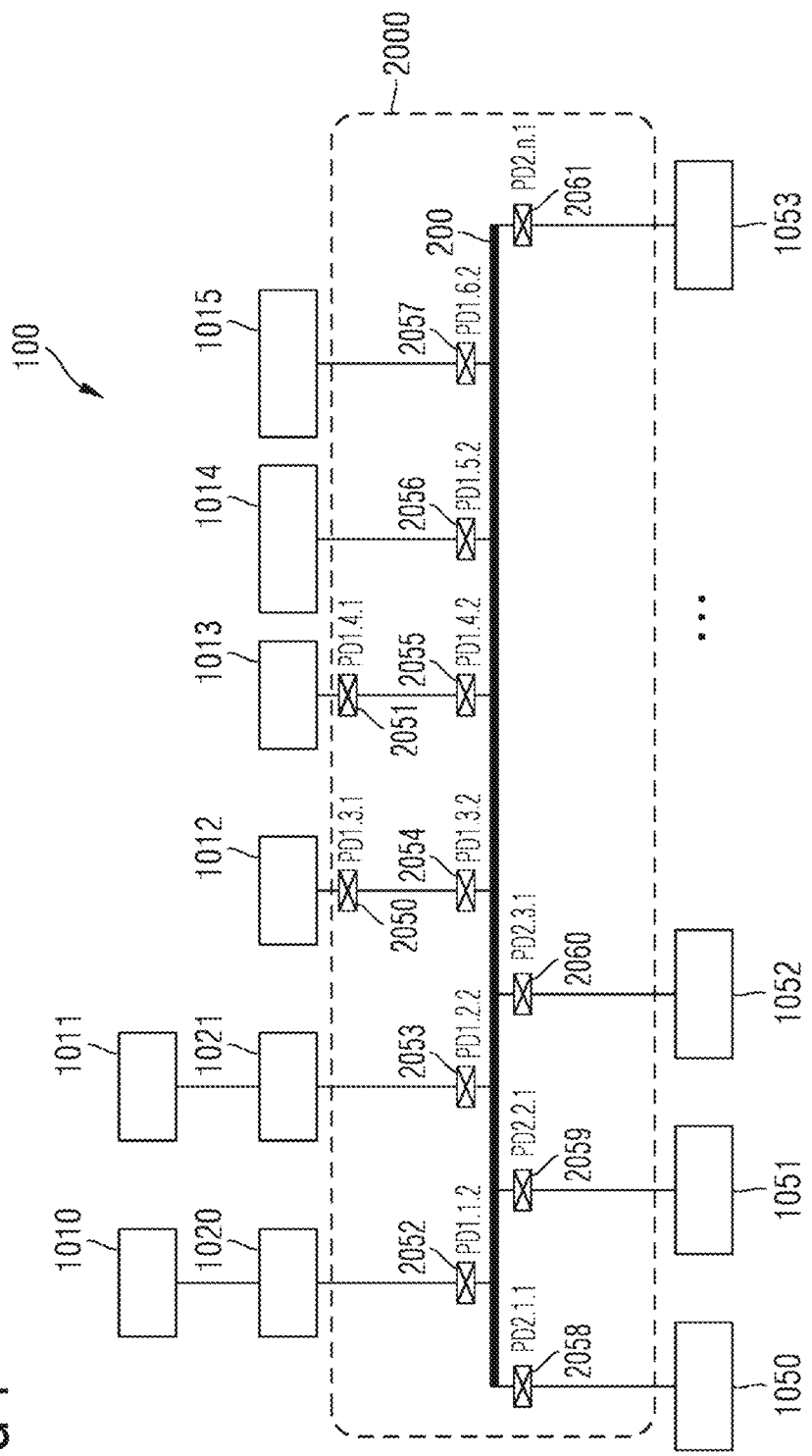
FIG. 1: shows a DC network with a plurality of feed-in devices and loads.

An electrical network, according to at least one example embodiment of the invention, has feed-in devices, loads and a distribution network, which is arranged therebetween and has at least one busbar and at least one apparatus for opening or closing a DC circuit. The apparatus comprises:
 an electrical switch for opening or closing the DC circuit,
 a fault current detection device,
 a tripping unit,
 a pre-charging apparatus, and
 a control unit for automatically closing the electrical switch after pre-charging,
 wherein, if a fault current is detected by the fault current detection device, the electrical switch opens the DC circuit via the tripping unit, and the pre-charging apparatus restores the voltage on the busbar before the electrical switch is closed, wherein a plurality of loads can each individually be electrically disconnected via an electromechanical switch, and a plurality of loads can be electrically disconnected as a group via the at least one apparatus.

An electrical network, according to at least one example embodiment of the invention, has an advantage that the number of electrical switches, for example of solid-state switches, can be reduced, and both costs and power losses can thus be reduced. The fault current can be interrupted quickly, within 10 μs (microseconds), wherein the fault itself can be isolated more slowly using conventional electromechanical switches. After the loads are very quickly disconnected from the feed-in devices in the event of a fault, the actual isolation of the fault takes place via the electromechanical switches at a reduced fault current, or even at zero current in certain applications. As a result, the proposed electromechanical switches can have much smaller dimensions in comparison with switches in conventional networks. A further advantage is that the voltage on the busbar 200 is maintained and the rest of the system which is unaffected by the fault remains operable. Recharging the group is a much faster process than recharging the entire system.

In one configuration, the electrical switch of the at least one apparatus is a semiconductor switch.

In a further configuration, the at least one apparatus further comprises a communication unit.

The at least one apparatus may further comprise a control unit for a switch-on transient. This unit can suppress the switch-on transient.

In a further configuration, the pre-charging apparatus restores the voltage on the busbar after a first waiting time. Alternatively, the pre-charging apparatus can restore the voltage on the busbar after receiving a command. The pre-charging apparatus can receive this command via the communication unit.

In one configuration, the pre-charging apparatus interrupts the pre-charging operation if the voltage on the busbar does not rise, which indicates a fault that still exists.

In a further configuration, the control unit for automatically closing the electrical switch automatically closes said switch after a second waiting time. Alternatively, the control unit for automatically closing the electrical switch closes said switch after a voltage on the busbar above a threshold value has been restored.

In a further configuration, the electrical network is a DC circuit.

Figure 2:
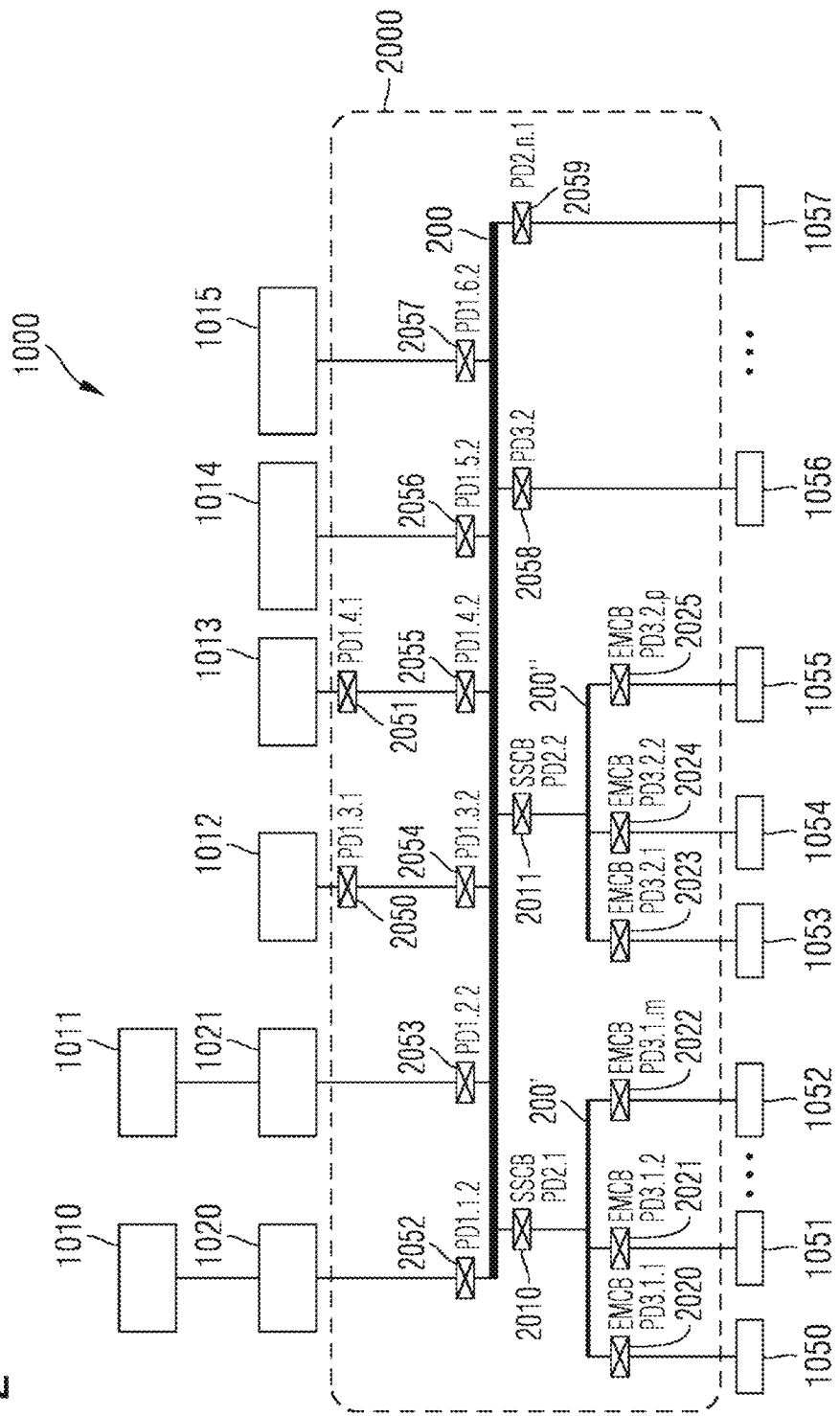
FIG. 2: shows an electrical network, according to at least one example embodiment of the invention, with a plurality of feed-in devices and loads.

FIG. 2 shows an electrical network 1000, according to at least one example embodiment of the invention. This network 1000 is provided with feed-in devices 1010; 1011; 1012; 1013; 1014; 1015 and loads 1050; 1051; 1052; 1053; 1054; 1055; 1056; 1057 and a distribution network 2000, which is arranged therebetween. The distribution network 2000 comprises busbars 200; 200'; 200", to which the feed-in devices 1010; 1011; 1012; 1013; 1014; 1015 and loads 1050; 1051; 1052; 1053; 1054; 1055; 1056; 1057 are electrically connected.

The distribution network 2000 comprises both apparatuses 2010; 2011 for opening or closing a DC circuit and also electromechanical switches 2020; 2021; 2022; 2023; 2024; 2025. Protection devices 2050; 2051; 2052; 2053; 2054; 2055; 2056; 2057; 2058; 2059 are furthermore included in the distribution network 2000.

A plurality of loads 1050; 1051; 1052; 1053; 1054; 1055; 1056; 1057 of the electrical network 1000, according to at least one example embodiment of the invention, form a respective group. For example, the loads 1050; 1051; 1052 form a first group. A second group is formed by the loads 1053; 1054; 1055.

In the event of a fault, each of these loads 1050; 1051; 1052; 1053; 1054; 1055 can be disconnected from the distribution network 2000 via an electromechanical switch 2020; 2021; 2022, 2023; 2024; 2025. The electromechanical switch 2020 is associated with the load 1050, the electromechanical switch 2021 is associated with the load 1051, and the electromechanical switch 2022 is associated with the load 1052. The electromechanical switches 2020; 2021; 2022 are electrically connected to a first busbar 200', which in turn is electrically connected to an apparatus 2010 for opening or closing a DC circuit by the busbar 200 of the distribution network 2000.

The same applies to the second group of loads 1053; 1054; 1055. The load 1053 is connected to the second busbar 200" via the electromechanical switch 2023. The load 1054 is connected to the second busbar 200" by the electromechanical switch 2024, and the load 1055 is also connected to the second busbar 200" by the electromechanical switch 2025. This second busbar 200", in turn, is electrically connected to an apparatus 2011 for opening or closing a DC circuit by the busbar 200 of the distribution network 2000.

The mode of operation of the electrical network 1000 according to at least one example embodiment of the invention, will be discussed on the basis of an exemplary fault in the connection between the load 1050 and the electromechanical switch 2020. This fault is detected by the apparatus 2010 for opening or closing a DC circuit and also by the electromechanical switch 2020. On account of the faster trip behavior of the apparatus 2010 for opening or closing a DC circuit, the apparatus 2010 is opened immediately and thus prevents any further flow of current in the direction of the fault from the other feed-in devices.

Meanwhile, the electromechanical switch 2020 also trips in order to isolate the fault. A fast-switching electromechanical switch 2020, which has a switching time in the region of a few ms (milliseconds), is preferred for this purpose. The apparatus 2010 for opening or closing a DC circuit can then be switched on again either after a fixedly defined period of time or in response to a command, which indicates that the fault has been eliminated.

The apparatus 2010 for opening or closing a DC circuit can recharge the first busbar 200' via the pre-charging apparatus 140 and then be switched on again. If the apparatus 2010 for opening or closing a DC circuit still detects a fault current, this apparatus 2010 can open once again and remain open.

An advantage of a method, according to at least one example embodiment of the invention, is that the feed-in devices and loads in the remaining part of the electrical network 1000, which are not affected by the fault, can continue to be operated and do not exhibit any failure. The loads in the group with the fault exhibit a brief failure, depending on the switch-off speed of the associated electromechanical switch and the time required for switching the apparatus for opening or closing a DC circuit on again. The downtime should be limited to a few tens of ms (milliseconds). Uninterruptible power supplies (UPSs) can be provided for very sensitive loads, for which the current should not be interrupted. Other loads should be able to withstand these brief downtimes, since these downtimes are already standard.

Figure 3:
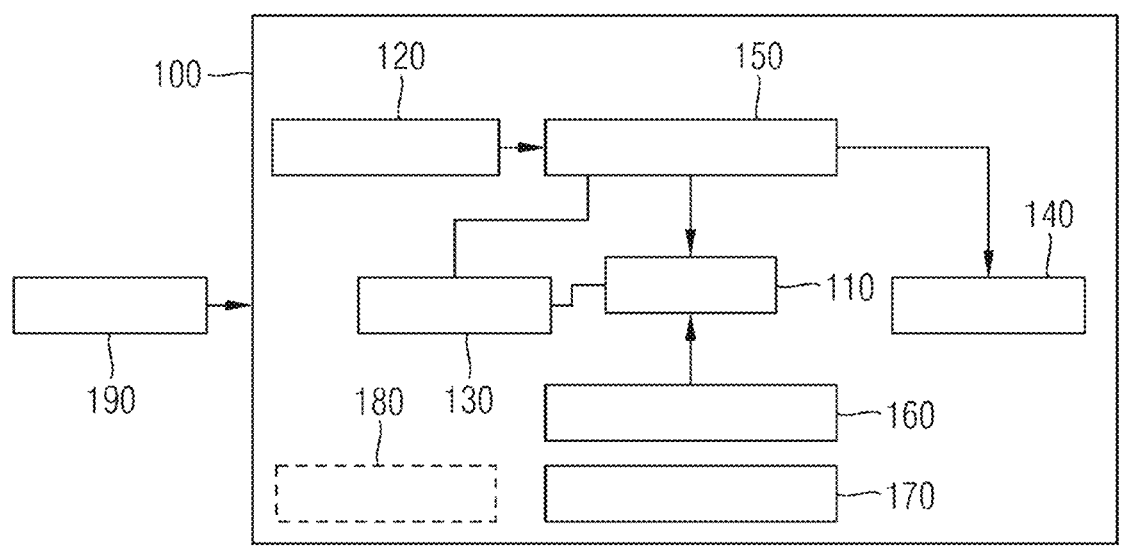
FIG. 3: shows an apparatus for opening or closing a DC circuit, according to at least one example embodiment of the invention.

FIG. 3 illustrates an example embodiment of the apparatus 2010; 2011 for opening or closing a DC circuit, which has at least one busbar 200; 200'; 200". The apparatus 2010; 2011 additionally comprises an electrical switch 110 for opening or closing the DC circuit, a fault current detection device 120, a tripping unit 130 and a pre-charging apparatus 140, wherein if a fault current is detected by the fault current detection device 120, the electrical switch 110 opens the DC circuit via the tripping unit 130, and wherein the pre-charging apparatus 140 restores the voltage on the busbar 200; 200'; 200" before the electrical switch 110 is closed. For automatic closing, the apparatus 2010; 2011 is further provided with a control unit 150, which can automatically close the electrical switch 110 after pre-charging.

The electrical switch 110 of the apparatus 2010; 2011 may, for example, be a solid-state switch or a semiconductor switch. For example, it may be a silicon (Si)-based, silicon carbide (SiC)-based or gallium nitride (GaN)-based semiconductor switch.

As is illustrated in FIG. 3, the apparatus 2010; 2011 may further comprise a communication unit 180. This communication unit 180 can receive commands from a superordinate control unit and/or coordinate apparatuses 2010; 2011 arranged in a distribution network 2000.

The apparatus 2010; 2011 may further comprise a control unit 160 for a switch-on transient. For example, the control unit 160 can suppress the switch-on transient.

The apparatus 2010; 2011 may further comprise a measurement unit 170 for measuring current and/or voltage values.

The pre-charging apparatus 140 may restore the voltage on the busbar 200; 200'; 200" after a first waiting time. Alternatively, the pre-charging apparatus 140 restores the voltage on the busbar 200; 200'; 200" after receiving a command. The command can be given to the pre-charging apparatus 140 via the communication unit 180.

The control unit 150 for automatically closing the electrical switch 110 may automatically close said switch after a second waiting time. The control unit 150 for automatically closing the electrical switch 110 may also close said switch after a voltage on the busbar 200; 200'; 200" above a threshold value has been restored. For this purpose, the control unit 150 for automatically closing an electrical switch 110 may receive the voltage values on the busbar 200; 200'; 200" from the measurement unit 170. If the voltage on the busbar 200; 200'; 200" does not rise during the pre-charging operation, this indicates that the fault has not yet been fixed. In this case, the pre-charging operation has to be interrupted.

The various components of the apparatus 100, according to at least one example embodiment of the invention, are supplied with electrical energy via the power supply 190. The power supply 190 may be external or internal.

The invention claimed is:

1. An electrical network having feed-in devices, loads and a distribution network, which is arranged therebetween and has at least one busbar and at least one apparatus for opening or closing a DC circuit, wherein the at least one apparatus comprises:
   an electrical switch to open or close the DC circuit;
   a fault current detection device;
   a tripping unit;
   a pre-charging apparatus; and
   a control unit to automatically close the electrical switch after pre-charging, wherein
      in response to detection of a fault current by the fault current detection device, the electrical switch is configured to open the DC circuit via the tripping unit, and the pre-charging apparatus is configured to restore a voltage on the at least one busbar before the electrical switch is closed, each of a plurality of the loads is configured to be electrically disconnected individually via an electromechanical switch, and the plurality of the loads are configured to be electrically disconnected as a group via the at least one apparatus, wherein the at least one apparatus further comprises another control unit to suppress a switch-on transient.

2. The electrical network as claimed in claim 1, wherein the electrical switch is a semiconductor switch.

3. The electrical network as claimed in claim 2, wherein the at least one apparatus further comprises a communication unit.

4. The electrical network as claimed in claim 3, wherein the at least one apparatus further comprises another control unit to suppress a switch-on transient.

5. The electrical network as claimed in claim 1, wherein the at least one apparatus further comprises a communication unit.

6. The electrical network as claimed in claim 1, wherein the pre-charging apparatus is configured to restore the voltage on the at least one busbar after a first waiting time.

7. The electrical network as claimed in claim 6, wherein the control unit is configured to automatically close said electrical switch after a second waiting time.

8. The electrical network as claimed in claim 1, wherein the pre-charging apparatus is configured to restore the voltage on the busbar after receiving a command.

9. The electrical network as claimed in claim 8, further comprising:

a communication unit, wherein the pre-charging apparatus is configured to receive the command via the communication unit.

10. The electrical network as claimed in claim 1, wherein the pre-charging apparatus is configured to interrupt a pre-charging operation in response to no rise in the voltage on the at least one busbar, which indicates that a fault still exists.

11. The electrical network as claimed in claim 1, wherein the control unit is configured to close said electrical switch after a voltage on the at least one busbar has been restored above a threshold value.

12. The electrical network as claimed in claim 1, wherein the electrical network is a DC circuit.

13. The electrical network as claimed in claim 1, wherein the control unit is configured to automatically close said electrical switch after a waiting time.

14. The electrical network as claimed in claim 1, wherein the pre-charging apparatus is configured to restore the voltage on the at least one busbar after a first waiting time.

15. The electrical network as claimed in claim 14, wherein the pre-charging apparatus is configured to interrupt a pre-charging operation in response to no rise in the voltage on the at least one busbar, which indicates that a fault still exists.

16. The electrical network as claimed in claim 14, wherein the control unit is configured to automatically close said electrical switch after a second waiting time.

17. The electrical network as claimed in claim 1, wherein the pre-charging apparatus is configured to restore the voltage on the at least one busbar after receiving a command.

18. The electrical network as claimed in claim 17, wherein the control unit is configured to close said electrical switch after a voltage on the at least one busbar has been restored above a threshold value.

19. The electrical network as claimed in claim 1, wherein the pre-charging apparatus is configured to interrupt a pre-charging operation in response to no rise in the voltage on the at least one busbar, which indicates that a fault still exists.

20. An electrical network having feed-in devices, loads and a distribution network, which is arranged therebetween and has at least one busbar and at least one apparatus for opening or closing a DC circuit, wherein the at least one apparatus comprises:

an electrical switch to open or close the DC circuit;

a fault current detection device;

a tripping unit;

a pre-charging apparatus; and a control unit to automatically close the electrical switch after pre-charging, wherein in response to detection of a fault current by the fault current detection device, the electrical switch is configured to open the DC circuit via the tripping unit, and the pre-charging apparatus is configured to restore a voltage on the at least one busbar before the electrical switch is closed, each of a plurality of the loads is configured to be electrically disconnected individually via an electromechanical switch, and the plurality of the loads are configured to be electrically disconnected as a group via the at least one apparatus, wherein the pre-charging apparatus is configured to interrupt a pre-charging operation in response to no rise in the voltage on the at least one busbar, which indicates that a fault still exists.

21. An electrical network having feed-in devices, loads and a distribution network, which is arranged therebetween and has at least one busbar and at least one apparatus for opening or closing a DC circuit, wherein the at least one apparatus comprises:

an electrical switch to open or close the DC circuit;

a fault current detection device;

a tripping unit;

a pre-charging apparatus; and a control unit to automatically close the electrical switch after pre-charging, wherein in response to detection of a fault current by the fault current detection device, the electrical switch is configured to open the DC circuit via the tripping unit, and the pre-charging apparatus is configured to restore a voltage on the at least one busbar before the electrical switch is closed, each of a plurality of the loads is configured to be electrically disconnected individually via an electromechanical switch, and the plurality of the loads are configured to be electrically disconnected as a group via the at least one apparatus, wherein the pre-charging apparatus is configured to restore the voltage on the at least one busbar after a first waiting time and wherein the control unit is configured to automatically close said electrical switch after a second waiting time.

* * * * *